United States Patent Office 3,036,963
Patented May 29, 1962

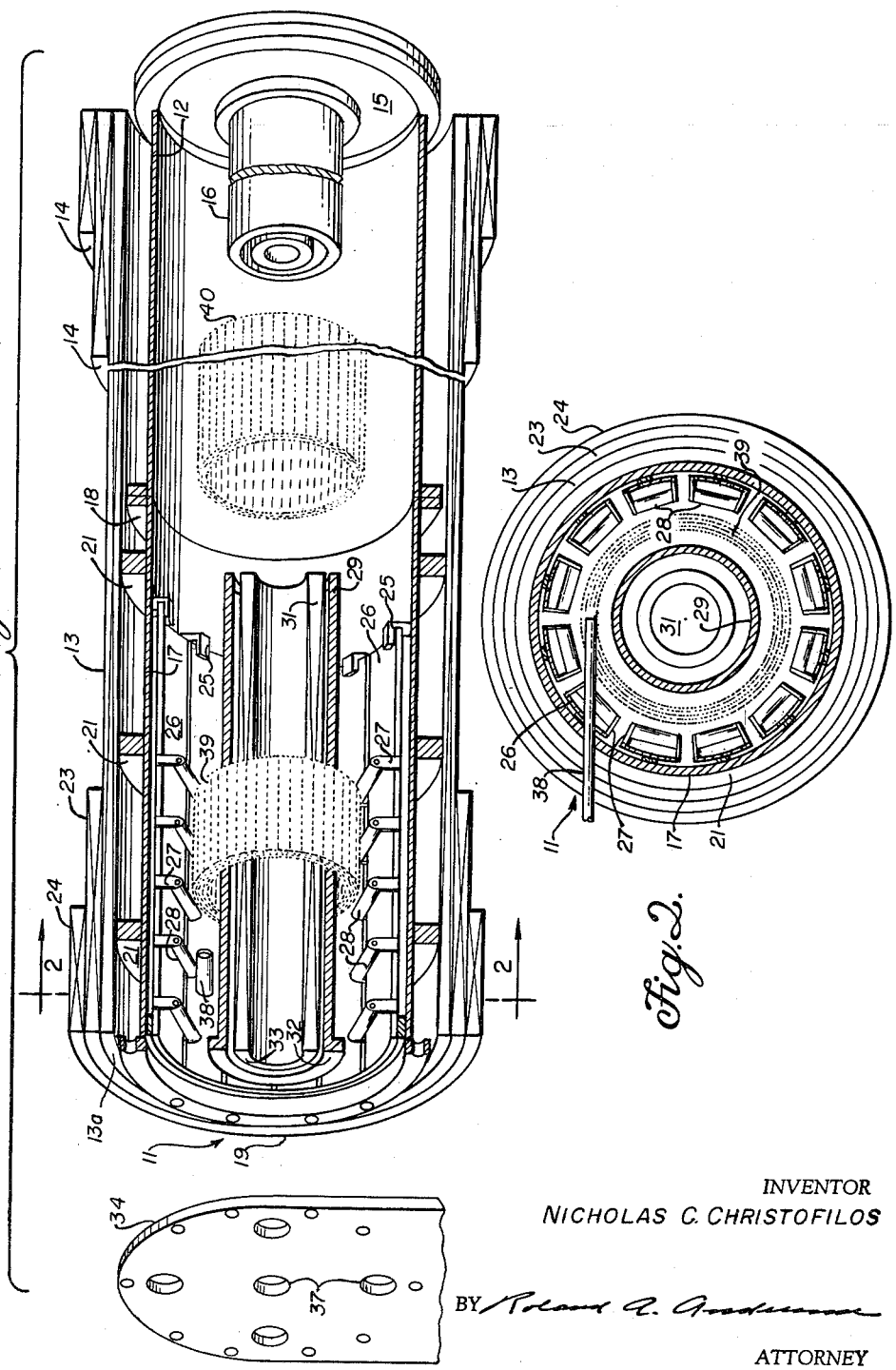

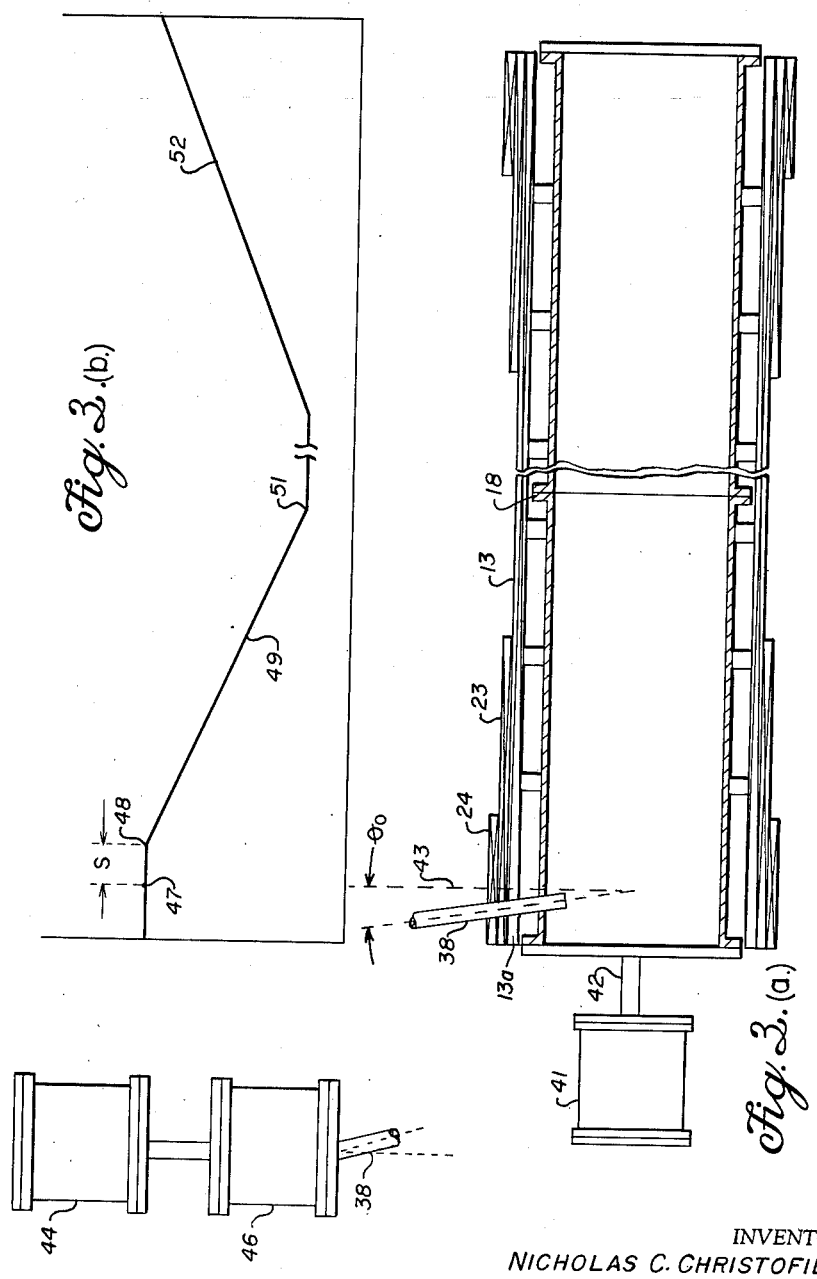

3,036,963
METHOD AND APPARATUS FOR INJECTING AND TRAPPING ELECTRONS IN A MAGNETIC FIELD
Nicholas C. Christofilos, Oakland, Calif., assignor to the United States of America as represented by the United States Atomic Energy Commission
Filed Jan. 25, 1960, Ser. No. 4,586
14 Claims. (Cl. 204—154.2)

The present invention relates generally to the injection of electrons into a magnetic containment field and more particularly to an injector system for injecting and trapping electrons in a magnetic containment field employed for the production of a high temperature gas or plasma.

It is now generally recognized that magnetic fields of certain configurations may be employed for the containment of high temperature ionized or charged particles and especially for the production of high temperature gases, i.e., plasmas, for a wide variety of utilitarian purposes. Axially symmetric magnetic fields including at least one gradientially intensified region have been so employed in various plasma devices. For example, several of the "Controlled Fusion Devices," described in volumes 31 and 32 of "The Proceedings of the Second International Conference on the Peaceful Uses of Atomic Energy," Geneva, 1958, a United Nations publication, employ an axially symmetric magnetic containment field having a central region of a uniform or minimum field intensity disposed between terminal regions having a higher intensity. The intensified field regions, sometimes called magnetic mirror fields, serve to close the end escape regions of the axially symmetric magnetic field, providing a containment field system for charged particles. Several methods have evolved for the introduction and trapping of gaseous ions to form a plasma in such a containment field system.

The present invention may be employed in such systems for introducing quantities of high energy electrons as may be required to add energy, effect ionization, regulate space charge and for other purposes as desired. However, the system is especially suitable for use in the "Astron" type plasma devices disclosed in my copending application S.N. 337,994, filed February 20, 1953, now abandoned and S.N. 756,044, filed August 19, 1958, as well as on pages 279–290, vol. 32, of the United Nations publication, ibid. The Astron devices disclosed therein include a solenoidal coil constructed and arranged to provide an axially symmetric magnetic field having a linear central region of uniform intensity and terminally disposed regions of increased intensity. Electron sources direct beams of energetic electrons into said magnetic field at a slight angle to a plane of reference normal to said field between a set of solenoidal coils excited with a periodically varying current to create a local variation in the magnetic field effecting trapping of the electrons to form a cylindrical layer of electrons (E-layer) rotating in the magnetic field. Neutral gaseous atoms are introduced into the field region and are ionized and heated by interaction with the electrons and the heated ions are trapped in the electromagnetic field pattern produced by the electron layer rotating within the magnetic field forming a contained high temperature gas or plasma.

The nature of the gas introduced as well as temperature and density operating conditions utilized depend upon the results desired. Any gas can be raised to a high temperature at low densities, for example, as might be required in spectroscopy, production of plasma jets for heating, propulsion, etc. Low atomic number materials such as deuterium or deuterium-tritium mixtures can be heated to temperatures of sufficient magnitude and of a sufficient density to induce nuclear fusion neutron producing reactions therein, the use of which neutrons is well known. With adequate densities and thermalized kinetic temperatures as disclosed in the aforesaid copending applications the fusion reaction rate of the low atomic number ions increases to a level at which the power output of the reaction exceeds the power input.

In accordance with the present invention there is provided a novel method for the irreversible injection and trapping of electrons in a magnetic confinement field of the character described. It has heretofore been known that an electron bunch in the form of a rotating cylinder traversing an axially symmetric magnetic field generates a second magnetic field. Now it has been discovered that said second field is of such a nature as to generate electrical currents in passive, i.e., unenergized, circuits disposed in proximity to the axially symmetric magnetic field. By introducing resistance or other energy dissipating components into said passive circuits a portion of the generated electrical current is dissipated. The dissipated electrical energy is obtained at the expense of the kinetic energy of the electrons. The net effect is that traversal of the field in an axial direction by the electron bunch is impeded. Accordingly, in an Astron, for example, an electron source may now be arranged to direct an intermittent electron beam tangentially into the region of maximum intensity of one of the terminal magnetic mirror fields with a small inward axial component of velocity forming therein an electron bunch in the form of a cylindrical rotating sheath of electrons. The leading edge of the electron bunch then enters the upper portion of the decreasing magnetic mirror field gradient with a small axial momentum. Now with dissipative passive circuits of the aforesaid character being distributed along the inwardly decreasing gradient region of the magnetic mirror field the kinetic energy which the electrons acquire in traversing the gradient may be dissipated. Therefore, upon entering the uniform central region of the magnetic confinement field the electrons in the injected bunch will remain therein and may spread axially to form a rotating cylindrical sheath of electrons, i.e., E-layer, as employed in an Astron. The action of the passive circuits may be viewed as an application of frictional force which is adequate to reduce the electron energy to below that required for escape over the magnetic mirror potential barrier.

The indicated arrangement requires no complicated externally energized coupled circuits and greatly simplifies the construction of apparatus. The effectiveness of the system is indicated to be of such a level that substantial densities of electrons can be injected even without neutralization and moreover high density is even more easily attained at higher electron energies such as those required at very high power Astron operating levels. Additional advantages are to be noted in that with proper operating conditions the electron bunches are effectively focused, i.e., compressed providing a higher effective current density.

It is therefore an object of the present invention to provide for the injection and trapping of electrons in a magnetic field.

A further object of the invention is to provide a method for controlling the rate of travel of an electron bunch in a decreasing axially symmetric magnetic field gradient by means of dissipative circuits coupled to the magnetic field of the electron bunch.

One other object of the invention is to provide an injection system for an Astron type plasma device in which electron bunches are directed into the region of maximum intensity of a magnetic mirror field with a slight axially inward velocity and dissipative circuits are disposed along the decreasing magnetic mirror field region to abstract kinetic energy from the electrons which therefore are trapped in the linear central magnetic field potential well of the Astron containment field.

Another object of the invention is to provide for the injection of successive electron bunches into the gradient region of an axially symmetric magnetic containment field such that entering bunches do not seriously interact with electrons previously injected.

A further object of the invention is to provide for the injection of electron bunches into the containment field of an Astron device in such manner that the presence of the E-layer does not disturb the electron bunch during injection.

A still further object of the invention is to provide apparatus for injecting and trapping electrons in an axially symmetric magnetic field having a linear central region and terminal regions of intensified field strength wherein electron bunches are introduced in an intensified region of said field to move along a decreasing magnetic field gradient while energy is abstracted from said electron bunches by dissipative circuits disposed along said field gradient.

Other objects and advantages of the present invention will be apparent in the following description and claims considered together with the accompanying drawings in which:

FIGURE 1 is a partly-exploded cross-sectional view of the subject injector as installed in an Astron device;

FIGURE 2 is a cross section view taken along line 2—2 of FIGURE 1 and showing in detail the passive loop dissipative circuit construction;

FIGURE 3a is a schematic diagram illustrating the positioning of the present injector when employed with an Astron plasma device;

FIGURE 3b is a graphical illustration showing the magnetic field intensity distribution within the apparatus arrangement of FIGURE 3a.

In order to effect electron injection into an axially symmetric magnetic field of the character described certain modifications in the magnetic mirror field regions of the plasma device is required. The principles are applicable for injection of charged particles into any axially symmetric magnetic field having a gradientially intensified field region including linear, as well as toroidal or other closed path field configurations. However, the method is especially suitable for injecting and trapping high energy, i.e., relativistic electrons, as required in Astron type plasma devices and the invention will be described as arranged for such purpose. Essentially, as disclosed in the aforesaid copending applications, an Astron plasma or fusion device is constructed with an elongated cylindrical vessel arranged for cooling if necessary, and for evacuation. Such device is also coupled to gas supply means for introducing desired gaseous materials into the vessel. An energized solenoid is disposed about the vessel to provide an axially symmetric magnetic field therein with the solenoid having a uniform ampere turns distribution along the central length of the vessel to provide the uniform linear central field region mentioned above. In the end region of the vessel the ampere turns distribution relative to length is increased and additional reflecting or magnetic mirror field coils may be provided in order to produce the terminally intensified, i.e., magnetic mirror field regions discussed above.

In accordance with the present invention such an Astron is modified or otherwise fitted with an injector 11, as shown in FIGURE 1 of the drawing. In the earlier Astron the injector included a series of three solenoids disposed in an end region and energized by a time varying current together with magnetic shielding tubes and electron guns directed therethrough into the region between a pair of said three solenoids, which injector is eliminated from the present description.

More particularly, such an Astron is modified to include or is fitted with an injector 11 which provides one terminal magnetic mirror field region and associated novel injector structure of such a modified Astron. The Astron structure now includes a cylindrical housing 12 having uniformly distributed ampere turn solenoidal segments 13 disposed about the central length and segments 14 having a progressively increased ampere turn ratio approaching the closed end 15. Said segments 13 and 14 are energized by current sources (not shown) as in usual practice to furnish the uniform central and one of the magnetic mirror fields of the Astron. A solenoidal coil structure 16 may be supported by end 15 coaxially within segments 14 to provide appropriate terminal field configurations as discussed more fully hereinafter.

The injector 11 may be constructed with a cylindrical vacuum housing 17 attached as by flanged joint 18 to housing 12 and provided at the outer end with a flange 19. Attached to the outer circumference of the housing 17 are a plurality of concentric, annular ribs 21 which support a solenoidal coil disposed coaxially about housing 17 which coil is also energized by current source (not shown). In accordance with the requirements of the present injection system the ampere turns density per unit of length of said solenoid is increased from that required to give a field intensity at joint 18 equivalent to that of the central uniform field in housing 12 progressively outward forming the second magnetic mirror field of the modified Astron. The increased ampere turn density may be provided in accordance with usual practice by overlaying additional coaxial coil segments 23 and 24 over a uniformly wound extension 13a of solenoidal segments 13, wherefore said solenoid would constitute coil segments 13a, 23 and 24. Alternatively, the axial distance between the turns may be reduced progressively outward along the length of the solenoid disposed about housing 17.

In the illustrated embodiment the coupled dissipative circuits are provided as resistive loops supported in parallel relation longitudinally along the inner circumference of housing 17 by a plurality of metallic resistor mounting strips 26. The strips are preferably mounted on housing 17 in such a manner as to permit individual removal of each strip; for example, by means of brackets 25 which receive and hold one end of a strip while the other end is bolted to the housing. Ordinarily the mounting strips 26 extend along at least the region of maximum mirror field intensity and along the length of the inwardly decreasing gradient mirror field region. Paired inwardly extending conductor brackets 27 are attached at spaced intervals along the length of each strip 26 with the paired brackets facing oppositely across the strip. Supported between the inner ends of each pair of brackets 27 is a resistor 28 having good high frequency operating properties. One type of suitable high frequency resistor is made in the form of a glass tube structure with a very thin resistive material coating deposited evenly along the inner or outer surface and provided with suitable end terminals. The thickness of the resistive material should be much less than the skin depth corresponding to the frequency of the generated emf. It will be noted that each resistor 28 with the supporting paired mounting brackets 27 and the intervening width of strips 26 to which one end of opposing brackets 27 are attached constitutes a small closed loop including a resistive element. More specifically, each of such loops is a closed circuit including a resistor 28, a pair of brackets 27 and the intervening portion of strip 26 to which brackets 27 are attached. Adjacent loops are also connected radially through the mounting strips forming a coplanar resistive loop around the circumference of housing 17. Moreover, as best seen in FIGURE 2, the loops are disposed radially outward from the axis of housing 17 and parallel to a transverse plane therethrough so as to be disposed in an annular region concentrically about the axis of the injector 11. However, the spacing of the mounted resistors as shown therein is exaggerated for simplicity of illustration. In actual practice resistive loops are spaced more closely along the axial length of strips 26, but not so close that the mutual inductance between adjacent resistors need to be taken into consideration. A distance greater than 10 cm. between the resistors gives no mutual inductance effects. Moreover, the adjacent ends of the coplanar mounted resistors can be connected and the resistor length limited in order to reasonably approximate a circular loop.

For the most effective operation of the injector, a cylindrical non-magnetic metallic barrel 29 is disposed concentrically within the length of housing 17 and enclosing a coaxially disposed solenoidal coil 31 providing a preferred terminal magnetic field configuration. Such coil 31 is constructed of a varying number of conductor turns, or of varying axial distance between conductor turns, in the same manner as the outer mirror coil 22, and is energized by an external current supply (not shown). The indicated concentric relationship may be obtained by providing flanges 32 and 33 on barrel 29 and coil 31 respectively bolted to a coverplate member 34 in turn bolted to flange 19. Member 34 with flange 33 advantageously provides a cantilever support for coil 31; however, any other suitable means of support such as a spider bracket support may be used. Passages 37 in member 34 provide access to the annular chambers between housing 17 and barrel 29, and also to the central region of coil 31 whereby vacuum pumping may be effected.

A magnetic shielding tube 38 is mounted so as to direct electrons from an external electron gun (see below) in an approximately azimuthal direction into the space between the resistive loops and the barrel 29 in the region of maximum magnetic mirror field strength. The tube 38 is mounted at a slight angle axially inward to a plane normal to the axis of the housings 12 and 17 to impart a small inward axial velocity to the electrons. Upon injection of an electron beam through tube 38 there is formed a cylindrical layer of electrons or electron bunch 39 rotating in the magnetic mirror field region between the resistive loops and barrel 29. Because of the initial axial velocity imparted by the inclination of tube 38 the electrons move axially inwards to clear the tube on rotation as described and enter the upper end of the decreasing magnetic mirror field gradient. Ordinarily, additional axial velocity would be provided by such an inwardly decreasing field gradient. However, as described more fully hereinafter, said resistive loops being magnetically coupled to the electron bunch provide a frictional force which decreases the energy of the electrons and offsets the effect of the decreasing field gradient. Therefore the electron bunch is trapped upon entry into the linear uniform field in housing 12 to form an Astron E-layer 40 within the uniform magnetic field region in housing 12.

Various relations and details of the injector are further illustrated in FIGURE 2 wherein the tank 17 and barrel 29 have an inner and outer radius of $R_1$ and $R_2$, respectively. The peripheral resistive loops disposed in the annular space between tank 12 and barrel 29 may be considered to be at an effective radius $R_s$ inwardly from the resistors 28 noting that each loop lies in a plane normal to the longitudinal axis of the housing 17 and barrel 29. The electron gyration radius, $R_e$, i.e., the radius of the electron bunch 39 is regulated by varying the magnetic field intensity relative to electron energy in a conventional manner, to be about one-half the sum of the radii, $R_1$ and $R_2$, with the electron bunch being thereby situated about midway between the resistors 28 and barrel 29. Likewise the radial distance from the outer housing 17 to the resistive loops may be made about equal to the distance from the resistors to the electron bunch 39, which is in turn equal to the distance from the inner barrel 29 to the electron bunch 39. In this connection, it may be noted that equidivision of these distances simplifies mathematical solutions and determination of injector operation parameters. However, other resistive loop configurations and spacings are also operative.

The apparatus described above and illustrated in detail in FIGURES 1 and 2 is illustrated schematically in FIGURE 3a as assembled with other components in a typical operating arrangement. FIGURE 3b located immediately above FIGURE 3a is a graphical illustration of the relative magnetic field intensities produced by energization of the various solenoids at vertically corresponding regions in housings 12 and 17.

More particularly, the injector and other Astron structure described above is provided with vacuum pumps 41 attached as by conduit 42 to passages 37 in coverplate 34. Electron injection tube 38 is directed tangentially into the region between resistors 28 and barrel 29 as described above. Moreover the tube 38 extends from an exterior location inwardly at a slight angle $\theta_0$ to a plane 43 which is normal to the axis of the injector 11. Pulsed electron beams of appropriate energy are directed longitudinally through tube 38 from an electron gun or an accelerator. For example, pulsed high energy high current electron beams may be produced in an electron gun 44 and given additional acceleration, if required, by passage through one or more linear accelerator sections 46 and then directed through tube 38. (The gun 44 and sections 46 are shown in offset position in order to accommodate FIGURE 3b.) A suitable high current high energy electron gun is described in the copending patent application of Nicholas C. Christofilos and Kenneth W. Ehlers, Serial No. 744,297, filed June 24, 1958. The linear accelerator sections 46 may be of conventional design such as the klystron excited linear accelerator types well known in the art. Suitable power supplies (not shown) are provided in the customary conventional manner for energizing the various solenoidal windings. Gas supply means (not shown) may also be provided to supply an appropriate gas.

In operation the energetic electrons from gun 44 and accelerators 46 are injected as interrupted beams through the injector tube 38 tangentially into the magnetic field of the injector 11 in the region corresponding to point 47 of FIGURE 3b. A small axially inward velocity is provided by the slight angle $\theta_0$. To simplify operation the magnetic field intensity may be made uniform over a limited length in the region of tube 38, i.e., by providing a magnetic field intensity plateau between points 47 and 48 on the curve of FIGURE 3b. The injector magnetic mirror field region 49 disposed between points 48 and 51 is at a distance S from the injection point 47 so that no acceleration will be applied to the electrons from the static field as they travel this distance S. That is, the magnetic field (due to the outer solenoid coil in combination with solenoid 31), is made uniform along this distance S. Owing to the presence of the resistive loops S the leading edge of the bunch will be retarded so that the bunch length is compressed.

The final compressed electron bunch length may not greatly exceed the distance between housing 17 and barrel 29 otherwise the current confined in that bunch length cannot contribute to the slow-down effect. After traversal of the distance the bunch enters the decreasing mirror field gradient at point 48. Ordinarily the electron bunch would be impelled by traversal of a magnetic field gradient such as that existing inwardly beyond point 48 and could leave the system as noted above. However, with the present arrangement the electron bunch is retarded by interaction with the resistive loops while in field region 49. The bunch 39 acordingly moves through the resistive loops losing energy to the loops with the axial velocity thereby being regulated. In order to maintain the bunch 39 at a constant radius while the flux linked with the bunch changes, as the bunch moves along the mirror field region 49, the field intensity at each point must fulfill betatron operation conditions. That is, the change of flux through the bunch must be twice the product of the change of the guiding field multiplied by the enclosed area. Such a field configuration can be obtained by adjustment of the ampere turns distribution along coil 31. Advantageously, plasma pressure balancing means of the character described in my copending application S.N. 756,051, filed August 19, 1958 (now abandoned), may be disposed coaxially abutting upon the inner end of barrel 29 to provide the most effective terminal field configuration. In brief such a pressure balancing means may comprise a solenoid disposed coaxially upon the inner end of barrel 29 which solenoid is provided with a longitudinal ampere turns distribution providing a magnetic field distribution which balances any excess axial plasma pressure to establish steady-state equilibrium plasma conditions. The necessary current distribution, j, in the pressure balancing solenoid can be calculated for the vector potential A of the plasma since $$(1) \quad \frac{4\pi}{c}j = \nabla \times \nabla \times A$$

The self-consistent solution of such equation can be derived from hydrodynamic, diffusion and Maxwell's equations. A detailed and complete exposition of the solution of the necessary equations is given at pages 280–283 and in appendix 1, pages 286–288, of paper 2446 entitled "Astron Thermonuclear Reactor" appearing in the "Proceedings of the Second United Nations International Conference on the Peaceful Uses of Atomic Energy," volume 32, published in 1958. The solenoidal coil structure 16, disclosed above is preferably constructed similarly to provide a terminal magnetic field configuration which is similar to that obtained in the injector terminal region to provide symmetry. The latter arrangement indicated preferably includes the aforesaid plasma pressure balancing means.

The electron bunch 39 upon entering the Astron E-layer region in housing 12 is no longer under the constraints imposed by the resistive loops and is free to spread along the magnetic field to provide an E-layer confined between the mirror field regions 49 and 52 indicated in FIGURE 3b. Such E-layer corresponds to E-layer 40 shown in FIGURE 1 which occupies the linear uniform magnetic field region in housing 12. This region is the potential well mentioned previously. The energy stored in the electromagnetic field of the bunch 39 practically vanishes as the length of the bunch increases to 15 or 20 times its initial length. This energy is not lost, of course, but is transformed into electron kinetic energy. Additional bunches are injected sequentially to provide desired electron densities in the E-layer and any desired material may then be introduced to be ionized and confined to provide a high temperature gas or plasma, as in usual Astron practice.

The manner in which injection as described above is effected can better be understood as indicated hereinafter. The magnetic field of each electron bunch generates currents in the resistive loops resulting in electron energy loss. That is, the resistive loops absorb axial kinetic energy from the electron bunch. In other words, as the electron bunch slides into the potential well, a frictional force is created by the dissipative loops to absorb the momentum gain produced by traversal of the decreasing field gradient. Hence the bunch arrives at the bottom of the potential well, i.e., at the inner end of the magnetic mirror field with the axial momentum controlled or regulated wherefore the electrons are trapped to produce the E-layer.

Each radial coplanar series of resistors may be considered to constitute a resistive loop. The vector potential of the magnetic field of the bunch has been solved in the plane approximation, i.e., by assuming the electron bunch to be a straight electron beam and the two cylinders to be planes. With a spacing of the resistive loop and electron layer being at ⅓ distances between housing 17 and barrel 29 such an approximation leads to the conclusion that the ratio $\mu$ of the current induced in the loops to the current in the electron bunch is $$\mu = \left(\frac{60}{Lc}\frac{\omega_0^2}{a^2 + \omega_0^2}\right) \qquad (1)$$

where L is the inductance in henries per cm. length of the loop, $\omega_0$ is the frequency of the magnetic field of the moving bunch as it appears to the standing loop, c is the speed of light, and $a = R/L$, i.e., the ratio of resistance to inductance of the loop. The induced current in turn generates a magnetic field. The radial component of this field interacting with the electron current opposes the motion of the bunch inwardly, i.e., in the Z direction, where Z is the coordinate parallel to the longitudinal axis of the injector. The inductance of the loops per cm. length being about $3 \times 10^{-9}$ h. with the resistor elements having the optimum value for maximum losses; i.e., where $\omega L = R$, then $\mu \cong 0.1$. The electron energy loss must be equal to the energy loss in the loops, since the electrons are the only source of the dissipated energy. Moreover, the electron energy loss has also been calculated by integrating the force opposing the motion of the electron bunch in the Z direction. The two calculations gave as expected the same results.

The slowing down or frictional force can be expressed in terms of a radial magnetic field ($B_s$) which interacts with the electron current I, and yields a force $B_s \times I$. Thus the average value of the field can be calculated for the indicated passive resistor-loop arrangement where the individual loops of resistors are spaced at least 10 cm. apart to avoid mutual inductance effects. The result is, $$B_a = \frac{IN}{36L} \qquad (2)$$

where I is the current in electron bunch having a length no longer than the distance between housing 17 and barrel 29, N is the total number of circumferential resistive loops and L is the length of the resistive loop region.

The resistor-loop system is placed along at least the decreasing gradient of the magnetic mirror field and may also be disposed in the region of maximum intensity or a plateau region of peak intensity as described supra. The level to which the electrons can be allowed to ascend into the magnetic mirror field region and the value of initial axial momentum determine the frictional force required to obtain effective trapping. Generally, in an Astron it is desirable that the electrons be limited principally to the uniform linear central field region wherefore the maximum momentum required to be dissipated is the sum of the initial axial momentum and the momentum acquired in sliding from the peak field intensity to the linear field intensity. The first mentioned is often negligible as compared to the second. However, if undesirable oscillations tend to occur in the E-layer, confinement field design parameters may be varied so that a portion of the E-layer enters lower regions of the resistive loop arrangement to provide a damping effect.

A necessary condition for the effective performance of the injection system is that the axial defocusing force at the leading edge of the beam (due to the self-field of the bunch) be smaller than the slowing-down force. Otherwise, the bunch would tend to expand in the Z direction with the effective current diminishing very rapidly and with no resultant slowing down. Since both the defocusing force (due to the self-field) and the frictional force are proportional to the circulating current of the bunch, the ratio of these forces is independent of the magnitude of the current. However, the defocusing force is proportional to $(1-\beta^2)$ or $\gamma^{-2}$, thus decreasing rapidly as the electron energy increases. The approximate value of the defocusing field $\bar{B}$ (where $\bar{B} = E_Z - \beta B_r$) is $$\bar{B} = \frac{I}{30\gamma^2} \qquad (3)$$

This field must be smaller than $B_s$.

Hence
$$\gamma > 3.5 \tag{4}$$
or in an approximation
$$E > 1.25 \text{ mev.} \tag{5}$$

Since the value of $B_s$ is estimated to be accurate only within a factor of 2 (due to the fact that mathematical derivations were based on linear approximations rather than cylindrical computations), it is conservatively estimated that
$$E \cong 1.8 \text{ mev.} \tag{6}$$

Consequently, 2 mev. is about the minimum electron energy required for effective performance of the present injection system from focusing considerations alone. However, in this case the depth of the potential well which can be employed is such that only one or two bunches providing a low electron density E-layer can be injected and trapped. At 5 mev. electron energy, the self-defocusing force is only about 10% of the frictional force and at 50 mev. the defocusing force is practically non-existent. Therefore with increasing electron energy the system can operate with deeper potential wells, initially, i.e., higher ratios of mirror field to linear field intensities, to provide greater electron densities at higher electron energies as required for producing very high temperature and high density plasmas upon the addition of an appropriate gas. Therefore, the indicated injection system has a high degree of flexibility and may be employed, e.g., in either small or large scale devices wherein light element gases such as deuterium and deuterium-tritium mixtures could be introduced to produce plasmas at lower densities and temperatures capable of producing neutrons or at higher densities and temperatures to attain whatever fusion reaction rate is desired, respectively.

As an example, utilizing an Astron in which the E-layer 40 has an average radius of 27 cm., length 600 cm. and thickness of 10 cm. (outer radius 32 cm. and inner radius 22 cm.), an injector may be constructed employing the following parameters, dimensions and design values:

Parameters

| | |
|---|---|
| Electron energy | 5 mev. |
| Injection current | 200 amp. |
| Pulse length | 0.15 μsec. |
| Pulses per second | 30 to 60. |
| Average current density of injected electron beam | 0.9 to 1.8 ma. |
| Initial bunch length entering injector | 120 cm. |
| Final bunch length leaving injector | 30 cm. |
| Approximate maximum plasma density for continuous operation with the foregoing values | $2 \times 10^{12}$ cm.³ |

Dimensions and Design Values

| | |
|---|---|
| $R_1$ (housing 17 radius) cm | 47 |
| $R_s$ (coplanar resistive loop radius) cm | 37 |
| $R_e$ (final electron bunch radius) cm | 27 |
| $R_2$ (barrel 29 radius) cm | 17 |
| Resistor length of each resistor 28 cm | 15 |
| Resistor resistance (dependent on axial velocity) ohms | 10–20 |
| Number of resistors in each coplanar loop | 15 |
| Spacing between adjacent coplanar loops cm | 10 |
| Number of coplanar loops | 60 |
| Length of resistive loop section cm | 500–600 |

The electron bunch which is compressed in the injector stores considerable energy in the electromagnetic field. As the electron bunch enters the Astron E-layer region the electrons spread out axially over about a twentyfold greater length wherefore the stored energy is converted into electron kinetic energy. The stored electromagnetic energy in a bunch 30 cm. in length and a current of 6000 amp. is 300 kev. per electron which is gained by the electrons upon entry of the first bunch into the E-layer region.

The second incoming electron bunch loses stored electromagnetic energy in the same way but this energy is shared with the previously injected bunch. Thus the energy gained is now 150 kev. per electron. As the process continues the electrons which are already injected gain more and more energy which energy gained increases logarithmically as the injection continues. Upon injection of the Nth bunch the energy gained per electron is
$$\delta\phi = 300 \cdot \frac{\delta N}{N} \text{ kev.} \tag{7}$$

Hence, the total energy gain per electron the Nth bunch, after injection of $N_1$ additional bunches is
$$\phi = 300 \ln\left(\frac{N_1 + N}{N}\right) \text{ kev.} \tag{8}$$

The depth of the potential well for five mev. electrons may be 1 mev. Then,
$$\ln\left(\frac{N_1 + N}{N}\right) < 3.3 \tag{9}$$

After injection of 30 bunches Equation 9 has a value greater than 3.3; therefore, as set forth in Equation 9 the first electron bunch is lost. As a further example, after injection of 120 bunches the first five are lost while the energy gain of 20 other electron bunches is more than 50% of the depth of the potential well (the potential well being that region between fields 49 and 52). Hence, it is apparent that even more bunches can be injected without appreciable loss. Therefore the indicated factors assure injection of enough electrons at 5 mev. energies to obtain field reversal, as taught by the basic Astron concept, without relying upon scattering losses to force the electrons to move in phase space. Moreover, the interaction of the incoming bunches with the already injected electrons is negligible.

Examination of the interaction of the magnetic field of the E-layer electrons with the incoming bunches before they enter the E-layer region, is now in order. Such examination of the interaction is made with respect to an Astron of 5 mev. energy. The magnetic field of the E-layer is similar to the field of the solenoid; therefore it would attract the incoming bunches by creating a deeper potential well. This is undesirable as the dynamic value of the slowing-down field cannot change appreciably during the buildup of the layer. Consequently, it is not desirable for the mirror field to be modified by the self-field of the E-layer in the injection region. This effect can be avoided by providing coils which will create a field in the injection region equal and opposite to that of the E-layer field. These coils are those described in FIGURES 1 and 2 as solenoidal coils 13a, 23, 24 and 31. This combination restricts the magnetic field of the E-layer electrons to the E-layer region. (The plasma pressure balancing means of my copending application mentioned above supplements this effect.) Thus, an electron in the E-layer moving from the end to the center of the E-layer region must cross all the flux created by the E-layer current. This is very desirable in order to maintain the E-layer radius constant during the buildup phase. Initially, the 5 mev. electrons are injected at a radius equal to the Larmor radius. Consequently, the vacuum field is
$$B_0 R_e = \frac{P_0 c}{e} \tag{10}$$
where $P_0$ is the total mechanical momentum of the electrons and $R_e$ the desired injection radius. However, the electrons are not moving in perfect circles of radius $R_e$ because of the presence of random radial momentum. Hence, the electrons are spread radially in a region of finite thickness. The average value of the containing magnetic field is then the sum of the vacuum field plus one-half the self-field. Since the self-field is in the opposite direction to that of the vacuum field, we find that the average $\bar{B}$ is $$\bar{B} = B_0 - \tfrac{1}{2} B_e \qquad (11)$$

The flux created by the E-layer is $$\phi = \pi B_e R_e^2 \qquad (12)$$

As the electrons move back and forth from the ends to the center of the E-layer region they cross this flux, undergoing a change in azimuthal mechanical momentum equal to $$\delta p_\theta = \frac{e}{2c} B_e R_e \qquad (13)$$

Consequently, the azimuthal mechanical momentum becomes $$p_\theta = \frac{e}{c}(B_0 - \tfrac{1}{2} B_e) R_e \qquad (14)$$

The gyration radius is $$R = \frac{c}{e} p_\theta / \bar{B} \qquad (15)$$

Equations 11, 14 and 15 yield $$R = R_e \qquad (16)$$

Therefore confining all the E-layer flux within the E-layer region a constant radius of the layer may be maintained without requiring a change of the main guiding vacuum field.

It will be appreciated that the foregoing example is merely illustrative and not limitative as much greater electron energies and injection currents can be utilized. The dimensions indicated may be employed over a wide range of energies since the magnetic field strength can be varied to provide the desired electron bunch radius. With the indicated dimensions and design parameters about 20% of the initial electron bunch energy is dissipated. With a ratio of mirror field to central field intensity of about 1.15 the confined electrons must acquire about 25% more energy in order to escape and the deeper potential well noted above is quite conservative.

The injection and trapping of even a single electron bunch of the character described provides an E-layer electron density which is capable of producing a very high temperature albeit low density plasma. Assuming an initial vacuum of $10^{-8}$ mm. in the system there exists $6 \times 10^8$ air atoms/cm.$^3$. Upon introduction of deuterium, for example, the degree $\eta$ of neutralization, as a function of time is $\eta = (\eta_D + 8\eta_a)\sigma ct$ where $\eta_D$ is the deuteron density, $\eta_a$ the air density, $t$=time and $\sigma = 10^{-19}$ cm.$^2$, the ionization cross section. Assuming $\eta_D = 5 \cdot 10^9$/cm.$^3$, $\eta = 30t$ and the created plasma consists of about 50% deuterons and 50% air ions. As operation proceeds the air density decreases and eventually a pure deuteron plasma is produced. Indications are that plasma densities of the order of $10^8$ to $10^{11}$ deuterons/cm.$^3$ may be produced at kinetic temperatures in at least the tens of kilovolt range which is considerably in excess of those produced heretofore. A central field value in the Astron housing 12, i.e., the linear uniform magnetic field region as described above, of about 1000 gausses is suitable for such purpose. Utilizing a D–T gas mixture a plasma of sufficient density and at a sufficiently high temperature is produced whereby large number of neutrons are produced by nuclear fusion reactions. The 5 mev. example above could produce very copious quantities of neutrons even with D–D mixtures. With the injection of adequate densities of high energy electrons field reversal within the E-layer occurs and plasma densities of interest in the controlled thermonuclear or fusion reaction field may be produced.

While the description of the invention has included reference to a nuclear fusion reaction, it is to be understood that the invention is not limited by such theory and it is intended to claim the invention as defined by the appended claims without regard to such theory. Many other applications of the invention will occur to those skilled in the art. While there has been described in the foregoing what may be considered to be preferred embodiments of the invention modifications may be made therein without departing from the true spirit of the invention and it is intended to cover all such as fall within the scope of the appended claims.

What is claimed is:

1. Apparatus for manipulating electrons in an axially symmetric magnetic field gradient region comprising means for directing an electron beam tangentially into a relatively high intensity region of said magnetic field gradient forming a cylindrical electron bunch having an axial velocity toward a relatively low intensity region thereof, and coplanar resistive loop circuits disposed concentrically about the magnetic field gradient region traversed by said electron bunch being thereby inductively coupled to the magnetic field of said electron bunch and having induced therein dissipative currents effective to oppose the axial movement of said electron bunch.

2. Apparatus for manipulating electrons in an axially symmetric magnetic field having at least one gradientially intensified field region therein comprising means for directing an electron beam tangentially into the gradientially intensified region of the field at a slight angle to a plane normal to the axis of said field thereby producing a rotating cylindrical electron bunch having an axial velocity in the gradient of said field, and dissipative resistive loop circuit means disposed radially outward from said gradientially intensified field region being thereby inductively coupled to the magnetic field of said bunch for extracting energy from the electrons of said bunch thereby restraining the axial velocity of the electron bunch in traversing said intensified field region.

3. Apparatus for injecting and trapping electrons in an axially symmetric magnetic containment field comprising means including an energized solenoid disposed coaxially along a portion of said containment field for producing a gradientially intensified region therein, means for directing a beam of electrons tangentially into said intensified field region at a slight angle to a plane normal to the axis thereof to produce a cylindrical electron bunch having an axial velocity along said intensified field region toward a lower intensity region of said containment field, and dissipative passive loop circuit means disposed radially outward along the intensified field region and being thereby inductively coupled to the magnetic field of said electron bunch, said dissipative circuit means being thereby effective to extract energy from the electrons and retard the axial momentum of the electrons in the gradient region, whereby the electrons are trapped in the lower intensity regions of said containment field.

4. Apparatus as defined in claim 3 wherein said dissipative circuits each comprise a coplanar resistive loop constructed of a series of resistive loops disposed substantially coplanarly to form a ring and connected electrically in series, said coplanar loops being arranged in spaced parallel relation coaxially along said intensified magnetic field region.

5. Apparatus for injecting and trapping energetic electrons in an axially symmetric magnetic field having a uniform central region and terminal regions of gradientially increased magnetic field intensity within an evacuated cylindrical housing comprising means including a solenoid disposed coaxially with respect to said housing to provide one of said terminally intensified magnetic field regions, electron source means arranged to direct an electron beam through a shielding guide tube tangentially into the region of maximum intensity of said field region at a slight angle to a plane normal to the axis of said field to produce a rotating cylindrical electron bunch moving axially toward the lower intensity central region therein, and resistive loop circuits disposed radially outward along the intensified field region at least in the inwardly decreasing field gradient which loop circuits are inductively coupled to the magnetic field of said electron bunch producing therein dissipative currents effective in retarding the axial velocity of the electron bunch along said gradient, whereby the electrons of said bunch are trapped upon entry into the uniform portion of the containment field.

6. Apparatus for injecting and trapping energetic electrons in an axially symmetric magnetic field having a uniform intensity central region and gradientially intensified terminal magnetic mirror regions in an evacuated cylindrical housing comprising means including a solenoid coaxially disposed within an extension of said housing to provide one of said mirror field regions, said regions having a substantial region of uniform maximum intensity, electron source means directing an energetic electron beam through electron guide tube means tangentially into said region of uniform maximum intensity at a slight angle to a plane normal to the axis, and coplanar resistive loops distributed coaxially along the uniform maximum intensity region and along the inwardly decreasing gradient of said intensified field region, whereby electrons injected into said field form a rotating cylindrical electron bunch which is compressed and from which energy is extracted by inductive coupling to said dissipative loops on passage through said gradient wherefore said electrons are trapped upon entry into said central region of the magnetic field.

7. Apparatus as defined in claim 6 wherein said resistive loops each comprise a plurality of high frequency resistors connected in series to provide a polygonal resistive ring loop disposed coaxially within said housing.

8. Apparatus as defined in claim 6 wherein said mirror field providing means includes an energized solenoid disposed concentrically within said extension of the housing and the ampere turns distribution thereof is such as to shape the gradient field intensity to satisfy betatron conditions in the electron bunch at approximately constant radius.

9. Apparatus for injecting high energy electrons into the uniform intensity central axially symmetric magnetic field region of an Astron device comprising in combination a cylindrical housing adapted to serve as an extension of an Astron vacuum chamber, a first solenoidal coil disposed concentrically about said housing wherein the ampere turns per unit length decrease inwardly along the axis of the coil, a plurality of passive multiple resistor coplanar loops coaxially disposed within the tank being thereby inductively coupled to cylindrical electron bunches moving axially in the field of said first coil, means supporting said resistor loops upon the inner wall of said tank wherein such means provide a conductive circuit for connecting the resistors to form said loop, a cylindrical conductive barrel extending coaxially along the length of the tank within the resistor loops, a second solenoidal coil coaxially mounted within and extending the length of said barrel, said coils having an ampere turns distribution relationship such as to maintain constant radius of gyration in the injected electron bunch, and means for supplying electrical current to said first and second coils.

10. In a method for injecting and trapping electrons in an axially symmetric magnetic field, the steps comprising producing a gradientially intensified region within said field, directing a beam of electrons tangentially into said intensified field region to produce an electron bunch moving axially in said field, and inductively coupling dissipative passive loop circuits to the magnetic field of said electron bunch while traversing at least the decreasing field gradient region of said field to reduce the kinetic energy of the electrons wherefore the electrons are trapped in lower intensity regions of said axially symmetric magnetic field.

11. The method as described in claim 10 wherein said dissipative circuits comprise coplanar resistive loops disposed coaxially along said decreasing field gradient.

12. In a method for injecting and trapping electrons in an axially symmetric magnetic containment field having a central region of uniform intensity and terminal intensified regions disposed in an evacuated zone, the steps comprising directing a beam of energetic electrons tangentially into the region of maximum intensity of said field at a slight angle to a plane normal to the axis thereof to form a rotating cylindrical electron bunch moving axially toward said central field region through the inwardly decreasing gradient of the intensified field region, and inductively coupling resistive passive loop circuits to the magnetic field of said bunch to dissipate kinetic energy of the electrons, thereby reducing the axial velocity thereof whereby said electrons are trapped to form a rotating cylinder of electrons upon entry into said uniform field region.

13. The method as defined in claim 12 wherein the injected electron beam is interrupted periodically so that successive electron bunches are injected and trapped to provide said electron cylinder.

14. In a method for producing a high temperature gas or plasma in an axially symmetric magnetic containment field having a central region of uniform intensity and terminal intensified regions disposed in an evacuated zone, the steps comprising directing a beam of energetic electrons tangentially into the region of maximum intensity of said field at a slight angle to a plane normal to the axis thereof to form a rotating cylindrical electron bunch moving axially toward said central field region through the inwardly decreasing gradient of the intensified field region, inductively coupling resistive passive loop circuits to the magnetic field of said bunch to dissipate kinetic energy of the electrons thereby reducing the axial velocity thereof, whereby said electrons are trapped to form a rotating cylinder of electrons upon entry into said uniform field region, and introducing a gas into said evacuated zone to interact with said electrons to be ionized and contained within the electromagnetic field pattern in said central field region.

References Cited in the file of this patent

UNITED STATES PATENTS

| | | |
|---|---|---|
| 2,675,470 | Wideroe | Apr. 13, 1954 |
| 2,790,902 | Wright | Apr. 30, 1957 |